US009505135B1

(12) United States Patent
Malstrom et al.

(10) Patent No.: US 9,505,135 B1
(45) Date of Patent: Nov. 29, 2016

(54) GRIPPER WITH CONFORMAL SPRING FINGERS

(71) Applicant: TYCO ELECTRONICS CORPORATION, Berwyn, PA (US)

(72) Inventors: Charles Randall Malstrom, Lebanon, PA (US); Richard Earl Hudson, Elizabethtown, PA (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 0 days.

(21) Appl. No.: 14/839,101

(22) Filed: Aug. 28, 2015

(51) Int. Cl.
*B25J 15/12* (2006.01)
*B25J 15/00* (2006.01)

(52) U.S. Cl.
CPC .............. *B25J 15/12* (2013.01); *B25J 15/0028* (2013.01)

(58) Field of Classification Search
CPC ........ B25J 7/00; B25J 15/0028; B25J 15/12; Y10S 294/902; Y10S 901/39
USPC ................................................ 294/86.4, 99.1
See application file for complete search history.

(56) References Cited

U.S. PATENT DOCUMENTS

| | | | |
|---|---|---|---|
| 3,343,864 A * | 9/1967 | Baer | B25J 15/0009 294/119.3 |
| 4,600,357 A | 7/1986 | Coules | |
| 4,632,444 A * | 12/1986 | Martinez | B25J 13/084 294/104 |
| 4,850,631 A * | 7/1989 | Dotsko | B25J 13/084 294/192 |
| 5,046,773 A * | 9/1991 | Modesitt | B25J 7/00 294/100 |
| 5,356,187 A * | 10/1994 | McCarthy | B63C 7/20 294/111 |
| 5,762,390 A | 6/1998 | Gosselin et al. | |
| 7,654,595 B2 * | 2/2010 | Yokoyama | B25J 9/142 294/119.3 |
| 8,011,708 B2 | 9/2011 | Becker et al. | |
| 8,141,924 B2 | 3/2012 | Albin | |
| 8,246,027 B2 | 8/2012 | Li et al. | |
| 8,382,177 B2 | 2/2013 | Rizk et al. | |
| 8,408,618 B2 * | 4/2013 | Unmuth | B25J 15/106 294/106 |
| 8,414,043 B2 | 4/2013 | Albin et al. | |
| 8,474,893 B2 | 7/2013 | Kawanami et al. | |
| 8,534,729 B2 | 9/2013 | Wilkinson et al. | |
| 8,550,519 B2 * | 10/2013 | Mankame | B25J 9/1085 294/86.4 |
| 8,840,160 B2 | 9/2014 | Caron L'Eeuyer et al. | |
| 8,936,289 B1 | 1/2015 | Kozlowski et al. | |
| 8,991,884 B2 | 3/2015 | DeLouis | |
| 2004/0212206 A1 * | 10/2004 | Chang | B25J 7/00 294/99.1 |
| 2008/0025822 A1 * | 1/2008 | Kim | H01L 21/68707 414/217.1 |
| 2013/0298759 A1 * | 11/2013 | Rotinat-Libersa | B25J 9/06 92/90 |

* cited by examiner

*Primary Examiner* — Dean Kramer

(57) ABSTRACT

A gripper section for use with a clamp arm for use with automated machinery. The gripper section includes a plurality of beam members which extend from a base, with each beam member of the plurality of beam members having a fixed end and a free end. The gripper section also includes a plurality of gripper surfaces proximate to the free ends, with each gripper surface attached to a respective beam member of the plurality of beam member. Each gripper surface of the plurality of gripper surfaces and its respective beam member move independently of the other plurality of gripper surfaces and plurality of beam members. Wherein the plurality of gripper surfaces and the plurality of beam members conform to the shape of an object/part to be manipulated by the gripper section.

19 Claims, 6 Drawing Sheets

GRIPPER WITH CONFORMAL SPRING FINGERS

FIELD OF THE INVENTION

The present invention is directed to gripper which conforms to different shapes. In particular, the invention is directed to a robotic gripper with conformal spring fingers.

BACKGROUND OF THE INVENTION

A common tool that is used on manipulators mounted on robots is a gripper, which allows the robot to grasp and move objects to fulfill their operational requirements. However, no single gripper design is optimal for all tasks or for all objects, since their tasks and the shape and size of the object with which they interact may change frequently. One way to customize a gripper for a specific task or a specific object is to design a set of fingers, also called jaws, for the gripper that is specific to that task or object. For example, a task requiring a robot to reach deep inside a narrow opening might benefit by having a set of long, narrow fingers. However, long, narrow fingers would not be suited to lifting and controlling large parts, where a shorter, broader finger would provide optimal control. For tasks involving grasping of a small or fragile object, a gripper with a compliant gripping facial surface is desirable.

In factory settings, in which robotic grippers may be required to interact with different parts, various gripper fingers may be used depending upon the application. For example, while grippers with parallel gripping surface are often used, various parts are better gripped with grippers having a shaped gripper surface. Consequently, as the grippers must be replaced for various parts, a technician must be employed to replace the fingers. This requires time, materials and special tools.

It would, therefore, be beneficial to provide a gripper which can conform to the part being picked up or engaged, thereby allowing the gripper to change the shape of its gripper surfaces based on the shape of the part and the force required to manipulate the part. It would also be beneficial to provide a gripper which can pick up a variety of parts of different shapes without the need to change the gripper.

SUMMARY OF THE INVENTION

An object of the invention is to provide a clamp arm or gripper for use in automated equipment which can pick up or manipulate a large variety of objects or parts of different shapes.

An object of the invention is to provide a clamp arm or gripper which can conform to the part being picked up or engaged, thereby allowing the gripper to change the shape of its gripper surfaces based on the shape of the object/part and the force required to manipulate the object/part.

An embodiment is directed to a gripper section for use with a clamp arm for use with automated machinery. The gripper section includes a plurality of beam members which extend from a base, with each beam member of the plurality of beam members having a fixed end and a free end. The gripper section also includes a plurality of gripper surfaces proximate to the free ends, with each gripper surface attached to a respective beam member of the plurality of beam member. Each gripper surface of the plurality of gripper surfaces and its respective beam member move independently of the other plurality of gripper surfaces and plurality of beam members. Wherein the plurality of gripper surfaces and the plurality of beam members conform to the shape of an object/part to be manipulated by the gripper section.

An embodiment is directed to a gripper section for use with a clamp arm for use with automated machinery. The gripper section includes a plurality of beam members which extend from a base, each beam member of the plurality of beam members having a fixed end and a free end with an engagement portion positioned therebetween. The gripper section also includes a plurality of gripper surfaces proximate to the free ends, with each gripper surface attached to a respective beam member of the plurality of beam member. Each gripper surface of the plurality of gripper surfaces and its respective beam member move independently of the other plurality of gripper surfaces and plurality of beam members. Wherein as the plurality of gripper surfaces conform to the shape of an object/part to be manipulated by the gripper section, the engagement portions of the plurality of beam members engage surfaces of the base or portions of other of the plurality of beam members to provide increased force to the object/part.

An embodiment is directed to a gripper section for use with a clamp arm for use with automated machinery. The gripper section includes a plurality of beam members and a plurality of gripper surfaces. The plurality of beam members extend from a base, with each beam member of the plurality of beam members having a fixed end and a free end with an engagement portion positioned therebetween. Each beam member of the plurality of beam members moves independently of the other beam members. The plurality of gripper surfaces are provided proximate to the free ends, with each gripper surface attached to a respective beam member of the plurality of beam members. The plurality of gripper surfaces move, pivot or rotate relative to the base and move, rotate or pivot independently from each other. The plurality of gripper surfaces and the plurality of beam members conform to the shape of an object/part to be manipulated by the gripper section. Wherein as the plurality of gripper surfaces conform to the shape of an object/part to be manipulated by the gripper section, the engagement portions of the plurality of beam members engage surfaces of the base or portions of other of the plurality of beam members to provide increased force to the object/part.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 2:
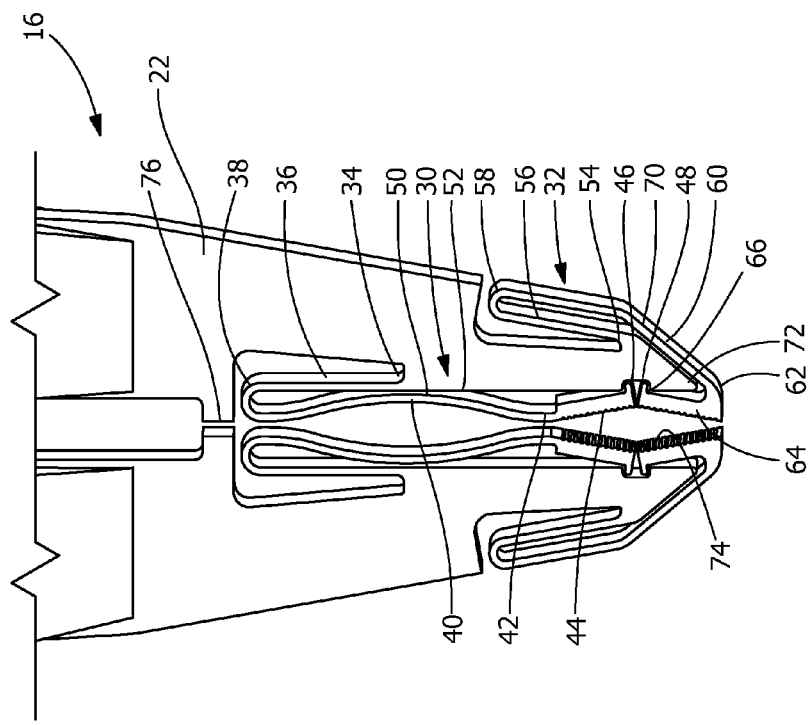
FIG. 2 is an enlarged perspective view of the gripper head of the clamp arm of FIG. 1.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

Figure 1:
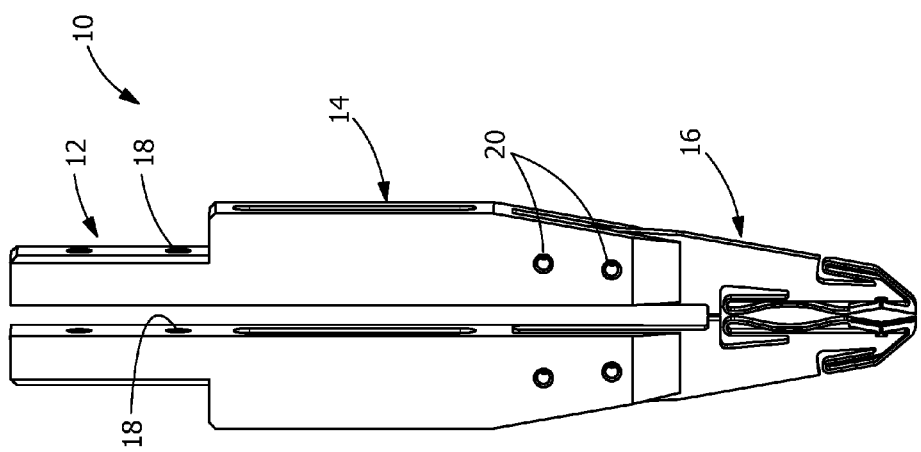
FIG. 1 is a perspective view of an illustrative embodiment of a clamp arm or gripper with gripping surfaces which can conform to the object being manipulated.

Referring to FIGS. 1 and 2, a clamp arm or gripper 10 is shown. The clamp arm 10 may be used with automated equipment, such as, but not limited to, robotic equipment. The clamp arm 10 can pick up or manipulate a large variety of objects or parts of different shapes (not shown). The clamp arm or gripper 10 can conform to the object or part being picked up or engaged. In the illustrative embodiments shown, gripper surfaces conform to the object or part based upon the shape of the object or part and/or the force required to manipulate the object or part, as will be more fully described.

The clamp arms 10 may be mounted to known apparatus for performing automated functions. Such apparatus may include a motor, a clamp arm mounting members and linkages to connect the motor to the a clamp arm mounting members. As such apparatuses are known, a further explanation of such apparatuses will not be included.

In the exemplary embodiment shown, each clamp arm 10 has a mounting section 12, an extension section 14 and a gripper section 16. In the embodiment shown, the mounting section 12 has openings 18 which extend therethrough. The openings 18 are configured to receive mounting hardware (not shown) therein to mount the mounting section 12 to the clamp arm mounting members. However, other configurations of the mounting section 12 can be used without departing from the scope of the invention.

In the illustrative embodiment, the extension section 14 is connected to the gripper section 16 by means of mounting hardware 20. However, in other embodiments, the gripper section 16 may be fastened to the extension section 14 by other means or alternatively, the gripper section 16 may be made in one piece with the extension section 14.

As best shown in FIG. 2, the gripper section 16 includes a first beam member or spring arm 30 and a second beam member or spring arm 32 which extends from a base 22 of the gripper section 16. The first spring arm 30 has a fixed end 34. A first section 36 extends from the fixed end 34. A bend 38 is provided between the first section 36 and a second section 40. A free end 42 is provided at the end of the second section 40 which is remote from the bend 38. Gripper surfaces 44 are provided proximate to and/or adjacent to the free end 42. A positioning member 46 is provided proximate the free end 42. The positioning member 46 is provided in recess 48 of the gripper section 16. The second section 40 has an engagement portion 50 which cooperates with a surface 52 of gripper section 16.

The second spring arm 32 has a fixed end 54. A first section 56 extends from the fixed end 54. A bend 58 is provided between the first section 56 and a second section 60. A free end 62 is provided at the end of the second section 60 which is remote from the bend 58. Gripper surfaces 64 are provided proximate to and/or adjacent to the free end 62. A positioning member 66 is provided proximate the free end 62. The positioning member 66 is provided in the recess 48 of the gripper section 16. The second section 60 has an engagement portion 70 which cooperates with a surface 72 of gripper section 16.

Each gripper surface 44, 64 may have grooves, serrations or projections 74 provided thereon. The grooves, serrations or projections 74 are provided to facilitate the gripping of the object/part by the gripper surfaces 44, 64.

A stop surface 76 is provided on the gripper section 16. The stop surfaces 76 of adjacent gripper sections 16 cooperate with each other to prevent the gripper sections 16 and the clamp arms 10 from moving to closely together, thereby preventing the overstress of the first spring arms 30.

In operation, a pair of clamp arms 10 are moved together to manipulate or engage an object/part. As the clamp arms 10 are moved together, the gripper surfaces 44, 64 engage the object/part. As the gripper surfaces 44, 64 are attached to the first and second spring arms 30, 32 respectively, the gripper surfaces 44 and the first spring arms 30 move independently of the gripper surfaces 46 and the second spring arms 32. This allows each of the gripper surfaces 46, 66 to move, pivot or rotate to better accommodate or conform to the shape of the object/part to be manipulated.

As the gripper surfaces 44, 64 encounter the object/part, the gripper surfaces 44, 64 can move, pivot or rotate about positioning members 46, 66, thereby maintaining the positioning members 46, 66 in the recesses 48. This allows the respective adjacent gripper surfaces 44, 64 to move, pivot or rotate while being maintained in position relative to each other, thereby preventing the object/part from being inadvertently moved between the gripper surfaces 44, 64.

As the gripper surfaces 44, 64 are continued to be moved together, the portion 50 of the second section 40 of the first arm 30 engages the surface 52 of gripper section 16 to provide increased grip force while controlling the over deflection of the first arm 30. In addition, the portion 70 of the second section 60 of the second arm 32 engages the surface 72 of gripper section 16 to provide increased grip force while controlling the over deflection of the second arm 32.

In the embodiment shown in FIG. 1, the gripper surfaces 44, 64 are angled relative to each other. This allows the gripper surfaces 44, 64 to influence the movement of the object/part to the center of the gripper surfaces 44, 64, thereby providing a more stable grip of the object/part. However, the gripper surfaces 44, 64 may have a parallel configuration without departing from the scope of the invention.

The gripper section 16 may be formed from any material having the appropriate strength, resilient (good spring properties), and weight (light weight) characteristics. Such material includes, but is not limited to, titanium, spring steel, stainless steel, polymers and glass filled plastic. The first and second spring arms 30, 32 may be formed by removing material using machining, wire electrical discharge machining (EDM), lasers, water jets or other known methods. Alternatively, first and second spring arms 30, 32 may be formed by stamping, extrusion molding or other known methods.

Figure 3:
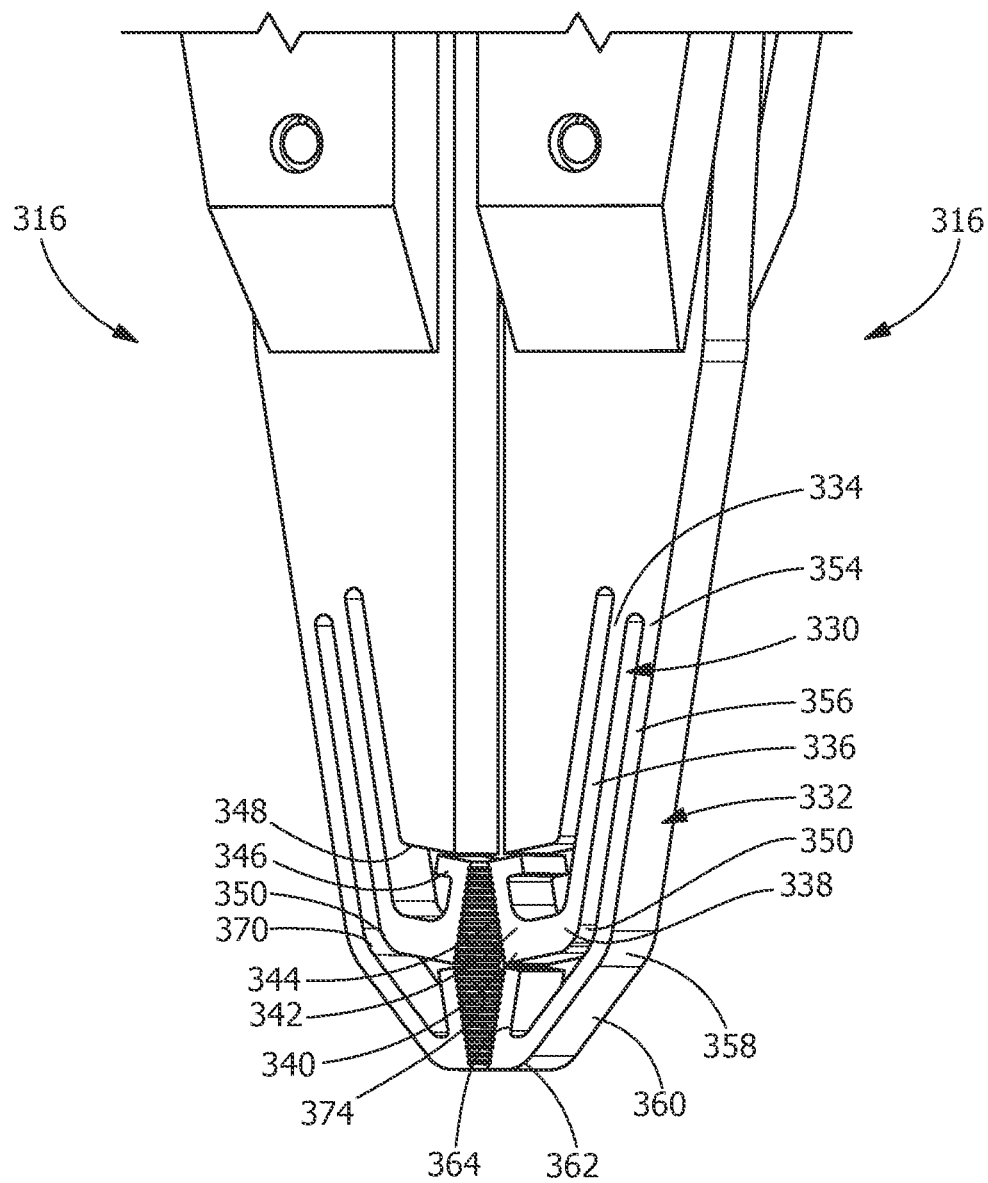
FIG. 3 is an enlarged perspective view of a first alternative gripper head.

Referring to FIG. 3, an alternate exemplary embodiment of a gripper section 316 is shown. The gripper section 316 includes a first beam member or spring arm 330 and a second beam member or spring arm 332. The first spring arm 330 has a fixed end 334. A first section 336 extends from the fixed end 334. A bend 338 is provided between the first section 336 and a second section 340. A free end 342 is provided at the end of the second section 340 which is remote from the bend 338. Gripper surfaces 344 are provided proximate to and/or adjacent to the free end 342. A positioning member 346 is provided proximate the free end 342. The positioning member 346 is provided proximate a surface 348 of the gripper section 316.

The second spring arm 332 has a fixed end 354. A first section 356 extends from the fixed end 354. A bend 358 is provided between the first section 356 and a second section 360. A free end 362 is provided at the end of the second section 360 which is remote from the bend 358. Gripper surfaces 364 are provided proximate to and/or adjacent to the free end 362.

Each gripper surface 344, 364 may have grooves, serrations or projections 374 provided thereon. The grooves, serrations or projections 374 are provided to facilitate the gripping of the object/part by the gripper surfaces 344, 364.

In operation, a pair of clamp arms are moved together to manipulate or engage an object/part. As the clamp arms are moved together, the gripper surfaces 344, 364 engage the object/part. As the gripper surfaces 344, 364 are attached to the first and second spring arms 330, 332 respectively, the gripper surfaces 344 and the first spring arms 330 move independently of the gripper surfaces 344 and the second spring arms 332. This allows each of the gripper surfaces 344, 364 to move, pivot or rotate to better accommodate or conform to the shape of the object/part to be manipulated.

As the gripper surfaces 344, 364 are continued to be moved together, a portion 350 of the first section 336 or the bend 338 of the first arm 330 engages a portion 370 of the first section 356 or bend 358 of the second arm 332 to provide increased grip force while controlling the over deflection of the first arm 330. This allows the first arm 330 to act in a serial progression with the second arm 332. The amount of force provided by the first arm 330 and second arm 332 can be determined or adjusted by changing the width, length or configuration of the spring arms.

In the embodiment shown in FIG. 3, the gripper surfaces 344, 364 are angled relative to each other. This allows the gripper surfaces 344, 364 to influence the movement of the object/part to the center of the gripper surfaces 344, 364, thereby providing a more stable grip of the object/part. The angled gripper surfaces 344, 334 also facilitate the holding and manipulation of objects/parts with round sections. However, the gripper surfaces 344, 364 may have a parallel configuration without departing from the scope of the invention.

The gripper section 316 may be formed from any material having the appropriate strength, resilient (good spring properties) and weight (light weight) characteristics. Such material includes, but is not limited to, titanium, spring steel, stainless steel, polymers and glass filled plastic. The first and second spring arms 330, 332 may be formed by removing material using machining, wire electrical discharge machining (EDM), lasers, water jets or other known methods. Alternatively, first and second spring arms 330, 332 may be formed by stamping, extrusion molding or other known methods.

Figure 4:
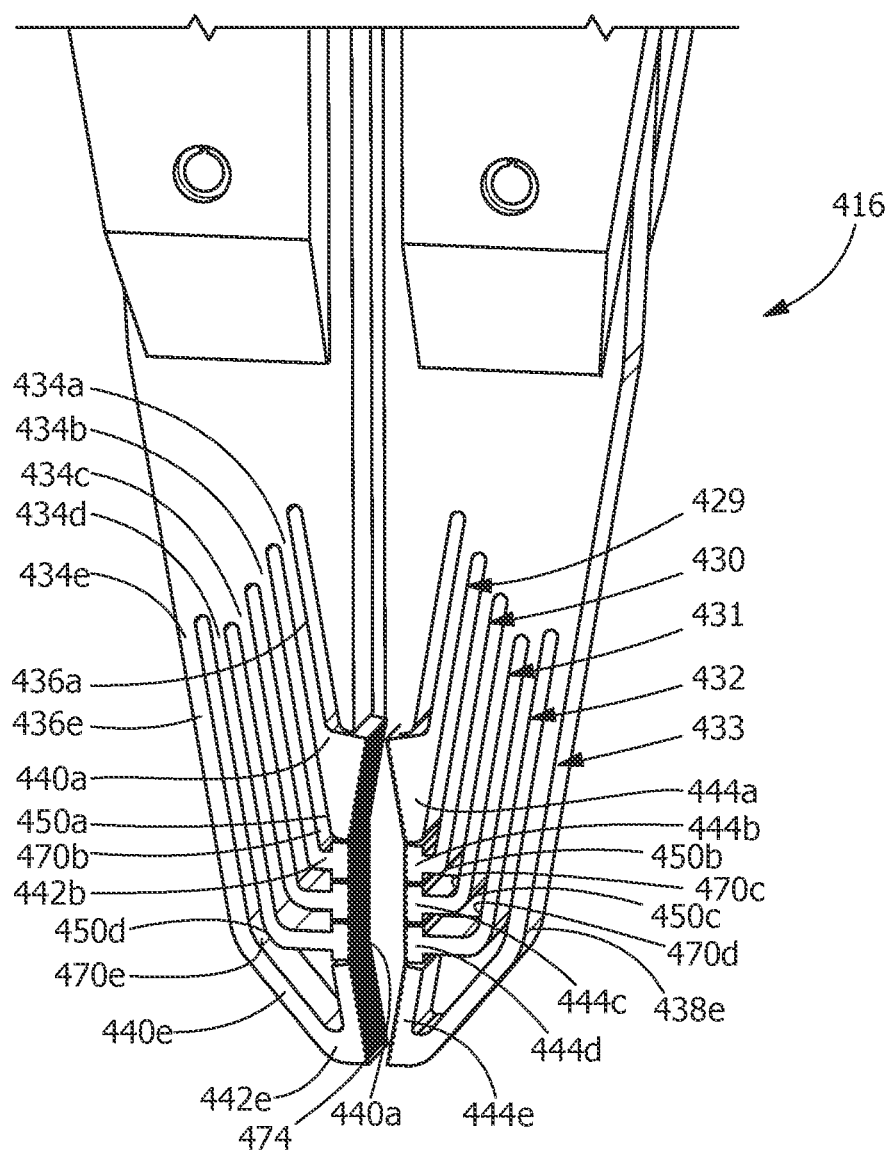
FIG. 4 is an enlarged perspective view of a second alternative gripper head.

Referring to FIG. 4, an alternate exemplary embodiment of a gripper section 416 is shown. The gripper section 416 includes a first beam member or spring arm 429, a second beam member or spring arm 430, a third beam member or spring arm 431, a fourth beam member or spring arm 432 and a fifth beam member or spring arm 433. While five spring arms are provided on each gripper section 416, other numbers of spring arms may be provided without departing from the scope of the invention. Each spring arm 429, 430, 431, 432, 433 has a fixed end 434a-434e. First sections 436a-436e extend from the fixed ends 434a-434e. Bends 438a-438e are provided between the first sections 436a-436e and second sections 440a-440e. Free ends 442a-442e are provided at the end of the second sections 440a-440e which are remote from the bends 438a-438e. Gripper surfaces 444a-444e are provided proximate to and/or adjacent to the free end 442a-442e.

Each gripper surface 444a-444e may have grooves, serrations or projections 474 provided thereon. The grooves, serrations or projections 474 are provided to facilitate the gripping of the object/part by the gripper surfaces 444a-444e.

In operation, a pair of clamp arms are moved together to manipulate or engage an object/part. As the clamp arms are moved together, the gripper surfaces 444a-444e of each clamp engage the object/part. As the gripper surfaces 444a-444e are attached to the spring arms 429-433 respectively, the gripper surfaces 444a-444e and their respective spring arms 429-433 move independently of the other gripper surfaces 444a-444e and their respective spring arms 429-433. This allows each of the gripper surfaces 444a-444e to move, pivot or rotate to better accommodate or conform to the shape of the object/part to be manipulated.

As the gripper surfaces 444a-444e are continued to be moved together, a portion 450a-450d of the first sections 436a-436d or the bends 438a-438d of the arms 429-432 engage respective portions 470b-470e of the first section 436b-436e or bends 438b-438e of the second arms 430-433 to provide increased grip force while controlling the over deflection of the first arm 430. This allows the first arm 430 to act in a serial progression with the arms 429-432. The amount of force provided by the arms 429-433 can be determined or adjusted by changing the width, length or configuration of the spring arms.

In the embodiment shown in FIG. 4, the gripper surfaces 444a and 444e are angled relative to each other and relative to the other gripper surfaces 444b-444d. This allows the gripper surfaces 444a and 444e to influence the movement of the object/part to the center of the gripper surfaces and toward the parallel gripper surfaces 444b-444d, thereby providing a more stable grip of the object/part. However, the gripper surfaces 444a and 444e may have a parallel configuration and gripper surfaces 444b-444d may have angled surfaces without departing from the scope of the invention.

The gripper section 416 may be formed from any material having the appropriate strength, resilient (good spring properties) and weight (light weight) characteristics. Such material includes, but is not limited to, titanium, spring steel, stainless steel, polymers and glass filled plastic. The spring arms 429-433 may be formed be removing material using machining, wire electrical discharge machining (EDM), lasers, water jets or other known methods. Alternatively, the spring arms 429-433 may be formed by stamping, extrusion molding or other known methods.

Figure 5:
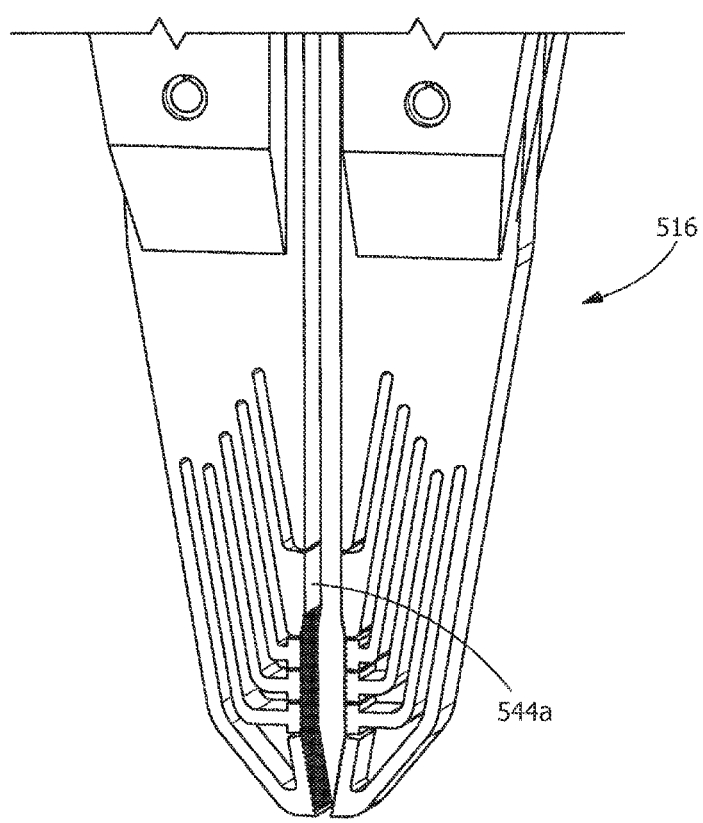
FIG. 5 is an enlarged perspective view of a third alternative gripper head.

Referring to FIG. 5, an alternate exemplary embodiment of a gripper section 516 is shown. Gripper section 516 has many similarities to gripper section 416. However, the gripper surface 544a has a modified configuration as compared to gripper surface and 444a.

Figure 6:
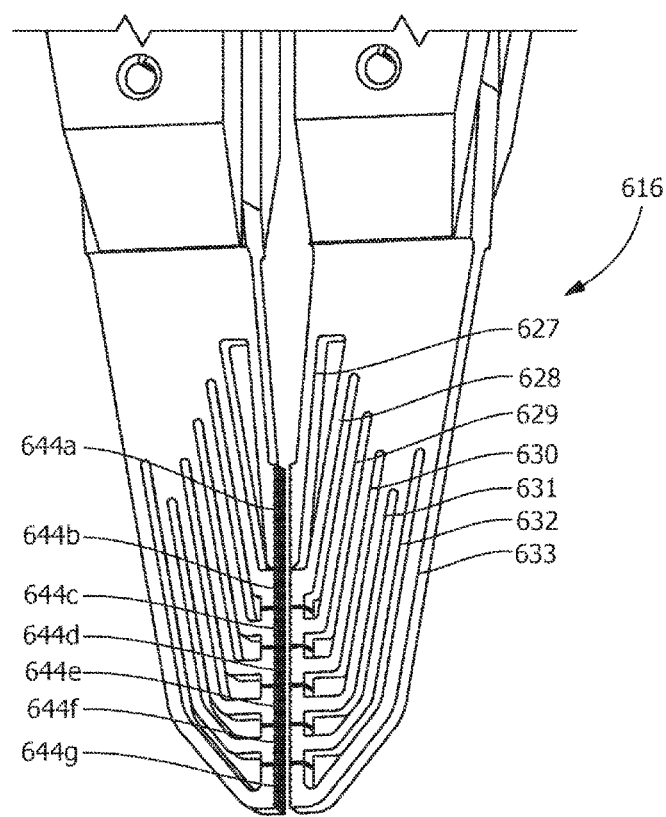
FIG. 6 is an enlarged perspective view of a fourth alternative gripper head.

Referring to FIG. 6, an alternate exemplary embodiment of a gripper section 616 is shown. The gripper section 616 includes a first beam member or spring arm 627, a second beam member or spring arm 628, a third beam member or spring arm 629, a fourth beam member or spring arm 630, a fifth beam member or spring arm 631, a sixth beam member or spring arm 632 and a seventh beam member or spring arm 633. While seven spring arms are provided on each gripper section 616, other numbers of spring arms may be provided without departing from the scope of the invention. Each spring arm 627, 628, 629, 630, 631, 632, 633 and the operation thereof is similar to the spring arms 429 through 433 and the operation thereof.

In the embodiment shown in FIG. 6, the gripper surfaces 644a-644g are essentially in-line and parallel relative to each other. However, some or all of the gripper surfaces 644a-644g may have angled surfaces without departing from the scope of the invention.

Figure 8:
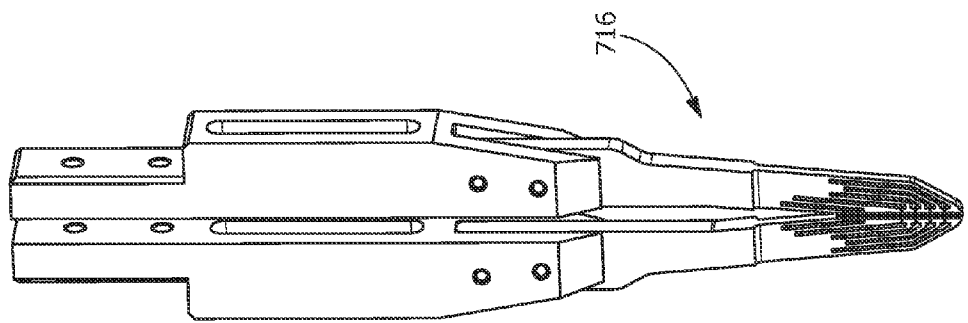
FIG. 8 is a perspective view of an illustrative embodiment of an alternate clamp arm or gripper with gripping surfaces as shown in FIG. 7.
Figure 7:
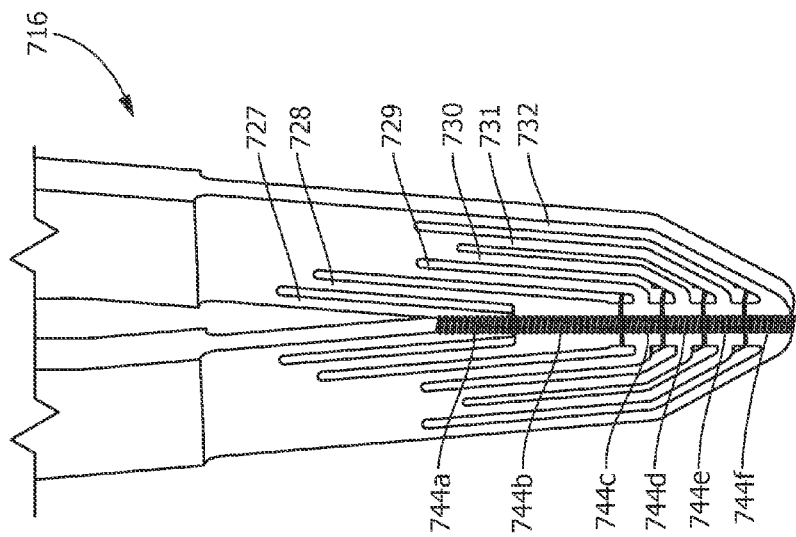
FIG. 7 is an enlarged perspective view of a fifth alternative gripper head.

Referring to FIGS. 7 and 8, an alternate exemplary embodiment of a gripper section 716 is shown. The gripper section 716 has a thinner profile than the gripper section 616 to allow the gripper section 716 to have a longer reach. The gripper section 716 includes a first beam member or spring arm 727, a second beam member or spring arm 728, a third beam member or spring arm 729, a fourth beam member or spring arm 730, a fifth beam member or spring arm 731 and a sixth beam member or spring arm 732. While six spring arms are provided on each gripper section 716, other numbers of spring arms may be provided without departing from the scope of the invention. Each spring arm 727, 728, 729, 730, 731, 732 and the operation thereof is similar to the spring arms 429 through 433 and the operation thereof.

In the embodiment shown in FIGS. 7 and 8, the gripper surfaces 744a-744f are essentially in-line and parallel relative to each other. However, some or all of the gripper surfaces 744a-744f may have angled surfaces without departing from the scope of the invention.

In all of the embodiments the gripper surfaces move, pivot or rotate based on the shape of the part or object to enable better gripping of the part or object. The fingers/beams/spring arms of the gripper sections are also resiliently or elastically deformable to allow an appropriate force to be exerted by the gripper surfaces on the part or object. This allows the gripper surfaces, the fingers/beams/spring arms and the gripper sections to pick up or manipulate a variety of parts or objects of different shapes without the need to change the gripper sections.

While the invention has been described with reference to a preferred embodiment, it will be understood by those skilled in the art that various changes may be made and equivalents may be substituted for elements thereof without departing from the spirit and scope of the invention of the invention as defined in the accompanying claims. In particular, it will be clear to those skilled in the art that the present invention may be embodied in other specific forms, structures, arrangements, proportions, sizes, and with other elements, materials and components, without departing from the spirit or essential characteristics thereof. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A gripper section for use with a clamp arm for use with automated machinery, the gripper section comprising:
a plurality of beam members which extend from a base, each beam member of the plurality of beam members having a fixed end and a free end;
a plurality of gripper surfaces proximate to the free ends, each gripper surface attached to a respective beam member of the plurality of beam members;
each gripper surface of the plurality of gripper surfaces and its respective beam member move independently of the other plurality of gripper surfaces and plurality of beam members;
engagement portions provided on respective beam members of the plurality of beam members;
wherein the plurality of gripper surfaces and the plurality of beam members conform to the shape of an object/part to be manipulated by the gripper section and the engagement portions engage surfaces of the base or other of the plurality of beam members to provide increased grip force and control deflection of the plurality of beam members.

2. The gripper section as recited in claim 1, wherein each beam member of the plurality of beam members has a first section which extends from the fixed end, a second section which extends from the free end and a bend provided between the first section and the second section.

3. The gripper section as recited in claim 1, wherein at least one beam member of the plurality of beam member has a positioning member to properly maintain at least one gripper surface of the plurality of gripper surfaces in position.

4. The gripper section as recited in claim 1, wherein at least one gripper surface of the plurality of gripper surfaces is angled relative to another gripper surface of the plurality of gripper surfaces to influence the movement of the object/part to the center of the plurality of gripper surfaces.

5. The gripper section as recited in claim 1, wherein at least one gripper surface of the plurality of gripper surfaces is parallel relative to another gripper surface of the plurality of gripper surfaces.

6. The gripper section as recited in claim 1, wherein a first gripper surface of the plurality of gripper surfaces is angled relative to second gripper surface of the plurality of gripper surfaces and a third gripper surface of the plurality of gripper surfaces is parallel relative to the second gripper surface of the plurality of gripper surfaces.

7. The gripper section as recited in claim 1, wherein the plurality of gripper surfaces have grooves, serrations, or projections provided thereon to facilitate the gripping of the object/p art.

8. The gripper section as recited in claim 1, wherein a stop surfaces is provided to prevent adjacent gripper sections from moving to closely together.

9. The gripper section as recited in claim 1, wherein the plurality of gripper surfaces move, pivot or rotate relative to the base.

10. The gripper section as recited in claim 1, wherein the plurality of gripper surfaces move, rotate or pivot independently from each other.

11. A gripper section for use with a clamp arm for use with automated machinery, the gripper section comprising:
   a plurality of beam members which extend from a base, each beam member of the plurality of beam members having a fixed end and a free end with an engagement portion positioned therebetween;
   a plurality of gripper surfaces proximate to the free ends, each gripper surface attached to a respective beam member of the plurality of beam members;
   each gripper surface of the plurality of gripper surfaces and its respective beam member move independently of the other plurality of gripper surfaces and plurality of beam members;
   wherein as the plurality of gripper surfaces conform to the shape of an object/part to be manipulated by the gripper section, the engagement portions of the plurality of beam members engage surfaces of the base or portions of other of the plurality of beam members to provide increased force to the object/part.

12. The gripper section as recited in claim 11, wherein each beam member of the plurality of beam members has a first section which extends from the fixed end, a second section which extends from the free end and a bend provided between the first section and the second section.

13. The gripper section as recited in claim 11, wherein at least one gripper surface of the plurality of gripper surfaces is angled relative to another gripper surface of the plurality of gripper surfaces to influence the movement of the object/part to the center of the plurality of gripper surfaces.

14. The gripper section as recited in claim 11, wherein at least one gripper surface of the plurality of gripper surfaces is parallel relative to another gripper surface of the plurality of gripper surfaces.

15. The gripper section as recited in claim 11, wherein a first gripper surface of the plurality of gripper surfaces is angled relative to second gripper surface of the plurality of gripper surfaces and a third gripper surface of the plurality of gripper surfaces is parallel relative to the second gripper surface of the plurality of gripper surfaces.

16. The gripper section as recited in claim 11, wherein the plurality of gripper surfaces have grooves, serrations, or projections provided thereon to facilitate the gripping of the object/part.

17. The gripper section as recited in claim 11, wherein the plurality of gripper surfaces move, pivot or rotate relative to the base and move, rotate or pivot independently from each other.

18. A gripper section for use with a clamp arm for use with automated machinery, the gripper section comprising:
   a plurality of beam members which extend from a base, each beam member of the plurality of beam members having a fixed end and a free end with an engagement portion positioned therebetween, each beam member of the plurality of beam members move independently of the other beam members;
   a plurality of gripper surfaces proximate to the free ends, each gripper surface attached to a respective beam member of the plurality of beam members, the plurality of gripper surfaces move, pivot or rotate relative to the base and move, rotate or pivot independently from each other;
   wherein the plurality of gripper surfaces and the plurality of beam members conform to the shape of an object/part to be manipulated by the gripper section;
   wherein as the plurality of gripper surfaces conform to the shape of an object/part to be manipulated by the gripper section, the engagement portions of the plurality of beam members engage surfaces of the base or portions of other of the plurality of beam members to provide increased force to the object/part.

19. The gripper section as recited in claim 18, wherein at least one gripper surface of the plurality of gripper surfaces is angled relative to another gripper surface of the plurality of gripper surfaces to influence the movement of the object/part to the center of the plurality of gripper surfaces.

\* \* \* \* \*